United States Patent [19]
Pacifici et al.

[11] 3,962,056
[45] June 8, 1976

[54] PHOTOSENSITIVE COMPOSITIONS CONTAINING BENZIMIDAZOLE SENSITIZERS

[75] Inventors: James G. Pacifici; Charles A. Kelly, both of Kingsport, Tenn.

[73] Assignee: Eastman Kodak Company, Rochester, N.Y.

[22] Filed: June 26, 1975

[21] Appl. No.: 590,783

Related U.S. Application Data
[62] Division of Ser. No. 526,012, Nov. 21, 1974, Pat. No. 3,912,606.

[52] U.S. Cl. .................. 204/159.15; 96/115 P; 96/115 R; 204/159.14; 204/159.16; 204/159.18; 204/159.19; 204/159.23; 204/159.24; 260/77.5 CR; 260/78.3 UA; 260/86.1 E; 260/81.5 A; 260/304; 260/307 D; 260/309.2; 260/836; 260/837 R; 260/864; 260/865; 260/869; 427/54; 526/328; 526/346; 526/343; 526/336; 526/332; 526/330

[51] Int. Cl.² .................. C08F 2/46; C08F 4/00

[58] Field of Search .................. 96/115 P, 115 R; 204/159.15, 159.16, 159.18, 159.19, 159.23, 159.24

[56] References Cited
UNITED STATES PATENTS

| | | | |
|---|---|---|---|
| 2,773,822 | 12/1956 | Kern .................. | 204/159.24 |
| 3,622,334 | 11/1971 | Hurley et al. .................. | 98/83 |
| 3,645,772 | 2/1972 | Jones .................. | 117/34 |
| 3,912,606 | 10/1975 | Pacifici et al. .................. | 204/159.15 |

*Primary Examiner*—Richard B. Turer
*Attorney, Agent, or Firm*—Clyde L. Tootle

[57] ABSTRACT

The invention relates to photopolymerizable polymeric compositions useful as coating and moldable compositions which are hardenable by ultraviolet radiation. These coating and moldable compositions comprise mixtures of photopolymerizable or photocrosslinkable unsaturated compounds and at least one photoinitiator selected from the group consisting of haloalkyl benzoxazoles, benzimidazoles and benzothiazoles.

14 Claims, No Drawings

PHOTOSENSITIVE COMPOSITIONS CONTAINING BENZIMIDAZOLE SENSITIZERS

This is a division of application Ser. No. 526,012 filed Nov. 21, 1974 now U.S. Pat. No. 3,912,606, issued Oct. 14, 1975.

This invention relates to photopolymerizable polymeric compositions useful as coating and moldable compositions. More particularly, the invention relates to photopolymerizable compositions comprising photopolymerizable or photocrosslinkable unsaturated compounds and heterocyclic photoinitiators which harden on exposure to ultraviolet radiation.

Heretofore it has been known to prepare coating compositions consisting of photopolymerizable ethylenically unsaturated materials. It is also known that the degree of polymerization and extent of crosslinking of these systems are dependent upon the intensity of the light. Under direct radiation, this conversion proceeds very slowly, principally because the polymerizable compounds absorb only short wavelength light. Attempts have been made, therefore, to find substances which may be added to the polymerizable or crosslinkable compounds that are capable of accelerating the polymerization.

There are many substances which have been found which are capable of accelerating photopolymerization. Such accelerators include, for example, halogenated aliphatic, alicyclic, and aromatic hydrocarbons and their mixtures in which the halogen atoms are attached directly to the ring structure in the aromatic and alicyclic compounds; that is, the halogen is bonded directly to the aromatic hydrocarbon nucleus; the halogen atoms are attached to the carbon chain in the aliphatic compounds. The halogen may be chlorine, bromine, or iodine. These sensitizers or photoinitiators are used in amounts of about 0.1 to 25% by weight and preferably from 0.5 to 5% of the compound-photoinitiator mixture. Suitable photoinitiators previously used in the art include, for example, polychlorinated polyphenyl resins, such as polychlorinated diphenyls, polychlorinated triphenyls, and mixtures of polychlorinated diphenyls and polychlorinated triphenyls; chlorinated rubbers, such as the Parlons (Hercules Powder Company); copolymers of vinyl chloride and vinyl isobutyl ether, such as Vinoflex MP-400 (BASF Colors and Chemicals, Inc.); chlorinated aliphatic waxes, such as Chlorowax 70 (Diamond Alkali, Inc.); Perchloropentacyclodecane, such as Dechloranet (Hooker Chemical Co.); chlorinated paraffins, such as Clorafin 40 (Hooker Chemical Co.) and Unichlor-70B (Neville Chemical Co.); mono- and polychlorobenzenes; mono- and polybromobenzenes; mono- and polychloroxylenes; mono- and polybromoxylenes; dichloromaleic anhydride; 1-chloro-2-methyl naphthalene; 2,4-dimethylbenzene sulfonyl chloride; 1-bromo-3-(m-phenoxy benzene); 2-bromoethyl methyl ether; chlorendic anhydride; and the like; and mixtures thereof, and the like. While there are many photoinitiators known in the art to increase the speed of curability or hardenability of coating and moldable compositions, there is a need in the art for more efficient and effective photoinitiators. Therefore, to provide more effective and efficient photoinitiators would be an advance in the state of the art.

It is, therefore, an object of the present invention to provide more effective and efficient ultraviolet photoinitiators.

Another object of the present invention is to provide useful coating and moldable compositions characterized by improved hardenability to ultraviolet radiation.

It is still another object of the present invention to provide compositions containing photoinitiators which provide ultraviolet curable and hardenable coatings and moldable articles such as films.

It is a still further object of this invention to provide compositions comprising ethylenically unsaturated polymerizble compositions and at least one photoinitiator capable of curing when exposed to actinic radiation and expecially ultraviolet radiation.

It is a still further object of this invention to provide compositions containing photoinitiators capable of curing and hardening when exposed to actinic radiations, including short wave-length visible radiations.

Further objects and advantages of the invention will be apparent to those skilled in the art from the accompanying disclosure and claims.

In accordance with the present invention, polymeric compositions are provided composed of ethylenically unsaturated compounds and a photoinitiator having the following formula:

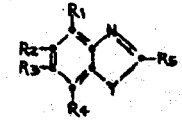

wherein $R_1$, $R_2$, $R_3$, and $R_4$ are H, alkyl, alkoxy, carboxy, alkoxycarbonyl, Cl, Br, $NO_2$, amino and can be the same or different;

$R_5$ is $CH_2X$, $CHX_2$, $CX_3$, aryl-$CH_2X$, aryl-$CHX_2$, Aryl-$CX_3$;

X is Cl or Br;

Y is O, S, $NR_6$; and $R_6$ is H, alkyl, or aralkyl.

Such suitable photoinitiators include, for example, 2-chloromethyl benzoxazole, 2-chloromethyl-5-terbutyl benzoxazole, 2-chloromethyl-6-tertbutyl benzoxazole, 2-(p-α-chlorotolyl)benzoxazole, 2-(p-α-chlorotolyl)-5-tertbutyl benzoxazole, 2-(p-α-chlorotolyl)-6-tertbutyl benzoxazole, 2-(p-α-chlorotolyl)-5-chloro benzoxazole, 2-(p-α-chlorotolyl)-6-chlorobenzoxazole, 2-(p-α-chlorotolyl)-5-phenylbenzoxazole, 2-(p-α-chlorotolyl)-6-phenylbenzoxazole, 2-bromomethyl benzoxazole, 2-(p-α-bromotolyl)benzoxazole, 2-(p-α-bromotolyl)-5-tertbutyl benzoxazole, 2-(p-α-bromotolyl)-6-tertbutyl benzoxazole, 1-ethyl-2-chloromethyl benzimidazole, 1-ethyl-2-bromomethyl benzimidazole, 1-ethyl-2-(p-α-chlorotolyl)benzimidazole, 1-ethyl-2-(p-α-chlorotolyl)-5-tertbutyl benzimidazole, 1-ethyl-2-(p-α-chlorotolyl)-6-tertbutyl benzimidazole, 1-ethyl-2-(p-α-chlorotolyl)-5-phenyl benzimidazole, 1-ethyl-2-(p-α-chlorotolyl)-6-phenyl benzimidazole, 2-chloromethyl benzothiazole, 2-tromomethyl benzothiazole, 2-(p-αchlorotolyl)benzothiazole, 2-(p-α-bromotolyl)benzothiazole, 2-(p-α-chlorotolyl)-5-tertbutyl benzothiazole, 2-(p-α-chlorotolyl)-6-tertbutyl benzothiazole, 2-(p-α-chlorotolyl)-5-phenyl benzothiazole, 2-(p-α-chlorotolyl)-6-phenyl benzothiazole, 2-(p-α-dichlorotolyl) benzoxazole and the like.

The ethylenically unsaturated compounds useful in the present invention can be for example lower alkyl and substituted alkyl ester of acrylic and methacrylic acid. Examples of such esters include: methyl methacrylate, ethyl methacrylate, 2-ethylhexyl methacrylate, isobutyl methacrylate, butyl acrylate, 2-ethylhexyl acrylate, 2-hydroxyethyl acrylate, 2-methoxyethyl acrylate, 2-hydroxypropyl acrylate, and the like. Polyacrylyl compounds represented by the general formula:

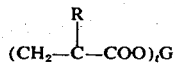

R is hydrogen or methyl; G is a polyvalent alkylene group of the formula

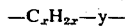

in which X is 2 to 10 and y is 0 to 2 (e.g. (a) divalent alkylene such as $C_xH_{2x}$ when $y=o$, i.e. $-C_2H_4-$, $-C_3H_6-$, $-C_5H_{10}-$, neo-$C_5H_{10}$ and the like; (b) trivalent alkylene such as $C_xH_{2x-1}$ when $y=1$, i.e.

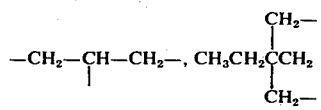

and the like; or (c) tetravalent alkylene such as $C_xH_{2x-2}$ when $y=2$,

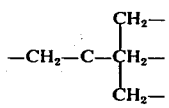

and the like); a divalent $-(C_rH_{2r}O)_tC_rH_{2r}-$ group in which t is 1 to 10 (e.g., oxyethylene, oxypropylene, oxybutylene, polyoxyethylene, polyoxypropylene, polyoxybutylene, polyoxyethylene-oxypropylene, $-CH_2C(CH_3)_2COOCH_2C(CH_3)_2CH_2-$ etc.); and r is the valence of G and can be from 2 to 4. Allyl acrylates and methacrylates; e.g., allyl methacrylate, allyl acrylate, diallyl acrylate. Other unsaturated compounds useful in the invention are, vinyl acetate, vinyl and vinylidine halides; e.g., vinyl chloride, vinylidine chloride, amides; e.g., acrylamide, diacetone acrylamide, vinyl aromatics; e.g., styrene, alkyl styrenes, halostyrenes, and divinyl benzenes.

In addition, other unsaturated compounds which can be photopolymerized by using the initiators of this invention are unsaturated polyester resins which are known in the art. Such polyesters may be prepared by reaction of α,β-unsaturated dicarboxylic acids and/or their anhydrides with polyhydric alcohols. A part of the α,β-unsaturated dicarboxylic acids can be replaced by saturated dicarboxylic acids or aromatic dicarboxylic acids, e.g., isophtnalic acid and the like. Polyhydric alcohols are preferably dihydric alcohols such as ethylene glycol, however, trihydric and polyhydric alcohols such as trimethylolpropane can also be conjointly used. Examples of such α,β-unsaturated dicarboxylic acids or their anhydride counterparts include maleic, fumaric, itaconic and citraconic and the like.

The above unsaturated compounds can be used alone or as mixtures of such compounds or mixtures in combination with other unsaturated components and the like.

The photoinitiators may be added at any time in the production of known and conventional light-sensitive materials in amounts conventionally used for photoinitiators. They are generally used in amounts of from 0.01 to 10%, preferably in amounts of from 0.5 to 3% by weight, based on the weight of the light-sensitive composition.

Conventional thermal inhibitors which are used in the production of light-sensitive compositions for example hydroquinone, p-methoxy phenol, t-butyl hydroquinone may also be used in the conventional manner in the light-sensitive compositions of this invention to alter the curing rates and/or to provide longer storage stability.

The ultraviolet stabilized photopolymerizable compositions of the present invention may also contain other additives, pigments, colorants, stabilizers and the like. For example, polymeric compositions, such as unsaturated polyesters may also contain and generally do contain other additives such as white or colored pigments or colorants, antioxidants, plasticizers, flow acids, processing aids, polymeric modifiers and the like.

This invention will be further illustrated by the following examples although it will be understood that these examples are included merely for purposes of illustration and are not intended to limit the scope of the invention.

EXAMPLE 1

2-(p-α-Chlorotolyl) benzoxazole is prepared according to the following procedure:

To a stirred solution of 26 g. (0.12 mole) 2-p-tolylbenzoxazole and 17 g. (0.12 mole) of sulfuryl chloride in 150 ml. chlorobenzene was added 0.1 g. of benzoyl peroxide. The reaction mixture was heated gently to reflux (134°) and held for 2 ½ hours. An analysis of the reaction mixture by VPC showed the reaction to be about ½ complete. Additional sulfuryl chloride (17.0 g.) was added and the reaction continued for 1 ½ hours. The solvent was removed by distillation and the residue dissolved in benzene, washed with water, 5% aqueous $NaHCO_3$ and finally with water. Hexane was added and the solution chilled. The crude product was collected by filtration, and recrystallized from ethanol to give 18 g. (63%) of an off white solid mp. 143°–45°C. The identity and purity of the product was established by NMR analysis.

The corresponding chlorinated tolylbenzothiazoles, tolylbenzimidazoles, methyl benzothiazole, methyl benzimidazole and methyl benzoxazoles can be prepared according to the above procedure by using the corresponding 2-p-tolylbenzothiazole, 2-p-tolylbenzimidazole, 2-methyl benzothiazole, 2-methyl benzimidazole and 2-methyl benzoxazole in place of 2-p-tolylbenzoxazole.

The polychlorinated tolyl and methyl benzoxazoles, benzothiazoles and benzamidazoles can be prepared by similar procedures for the monochlorotolyl benzoxazoles except that an excess of the sulfuryl chloride is used in the chlorination. The degree of chlorination can be determined by procedures known in the art.

EXAMPLE 2

2-(p-α-Bromotolyl) benzoxazole is prepared according to the following procedure:

To a stirred mixture of 105 g. (0.5 mole) of 2-p-tolylbenzoxazole, 100 g. N-bromosuccimide, and 1000 ml.

of carbon tetrachloride was added 3.0 g. of benzoyl peroxide. The mixture was heated at reflux for 5 hours and the solvent removed on the steam bath. The residue was combined with 1500 ml. of water, heated to boiling, and the insoluble material collected by filtration. The filter cake was washed twice with 250 ml. of hot water and recrystallized from ethyl acetate to give 89 g. (64%) of white plates ml. 168°–160°. The identity and purity of the product were established by NMR analysis.

The corresponding tolyl- and methylbenzothiazoles and tolyl- and methylbenzimidazoles can be prepared according to the above procedure by using the corresponding 2-p-tolyl- and methylbenzothiazole and 2-p-tolyl- and methylbenzimidazole in place of 2-p-tolyl-benzoxazole.

The polybromonated methyl and tolylbenzoxazoles, benzothiazoles and benzamidazoles can also be prepared by using an excess of N-bromosuccimide. The degree of bromination can be determined by procedures known in the art.

EXAMPLE 3

An unsaturated photopolymerizable polymeric composition is prepared as follows:

A polycaprolactone polyol (average molecular weight 550 and prepared by reaction of trimethylol propane with epsilon-caprolactone) 12 parts was mixed with 8.5 parts of 2-hydroxyethyl acrylate and 10 parts 2-methoxyethyl acrylate. To this mixture was added 14 parts of a 80/20 mixture of 2,4 and 2,6-tolylene diisocyanate and the mixture stirred at 50°C. for 10 hrs. This urethane resin was then diluted with an additional 25 parts 2-methoxyethyl acrylate.

EXAMPLE 4

An unsaturated photopolymerizable composition is prepared as follows:

A urethane resin composition was prepared by the procedure in Example 3. To this resin was added a mixture of 20 parts 2-methoxyethyl acrylate and 5 parts neopentylglycol diacrylate.

EXAMPLE 5

The following compositions were prepared and films (1 mil) were cast on rolled steel plates with a Garner Film Casting Knife. These samples were then exposed to a 1200-watt, 17-inch Hanovia mercury arc at a distance of 6 inches from the arc. The tack-free time of the cured compositions was determined.

| Composition No. | Ingredients | Parts by Weight | Tack Free Tire (sec.) |
| --- | --- | --- | --- |
| 1 | Unsaturated Polyester* (MA/IPA/PG) | 65 | 2000 (no cure) |
|   | Styrene | 35 |   |
| 2 | Unsaturated Polyester* (MA/IPA/PG) | 65 | 120 |
|   | Styrene | 35 |   |
|   | A - 2-(p-α-chlorotolyl)-benzoxazole | 1 |   |
| 3 | Unsaturated Polyester* (MA/IPA/PG) | 65 | 86 |
|   | Styrene | 35 |   |
|   | B - 2-(p-α-bromotolyl)-benzoxazole | 1 |   |
| 4 | Unsaturated Polyester** (MA/IPA/NPG) | 65 | 74 |
|   | Styrene | 35 |   |
|   | A | 1 |   |
| 5 | Unsaturated Polyester** (MA/IPA/NPG) | 65 | 96 |
|   | Styrene | 35 |   |
|   | Hydroquinone | 100 ppm. |   |
|   | A | 1 |   |
| 6 | Unsaturated Polyester** (MA/IPA/NPG) | 65 | 96 |
|   | Styrene | 35 |   |
|   | Hydroquinone | 100 ppm. |   |
|   | B | 1 |   |
| 7 | Unsaturated Polyester** (MA/IPA/NPG) | 32 | 130 |
|   | Styrene | 18 |   |
|   | CaCO₃ | 25 |   |
|   | Talc | 25 |   |
|   | A | 1 |   |
| 8 | Derakane 411-45 (which is a Acrylate Bisphenol A epoxy resin) (45% Styrene, Viscosity, 500 cps.) | 100 | 55 |
|   | A | 1 |   |
| 9 | Derakane 411-0-50 (50% Styrene, Viscosity 120 cps.) | 100 | 55 |
|   | A | 2 |   |
| 10 | Composition prepared in Example 3 | 100 | 70 |
|   | A | 2 |   |
| 11 | Composition prepared in Example 3 | 100 | 75 |
|   | B | 2 |   |
| 12 | Composition prepared in Example 4 | 100 | 45 |
|   | A | 2 |   |

-continued

| Composition No. | Ingredients | Parts by Weight | Tack Free Tire (sec.) |
|---|---|---|---|
| 13 | Composition prepared in Example 4 | 100 | 55 |
| | B | 2 | |

A is 2-(p-α-chlorotolyl)benzoxazole
B is 2-(p-α-bromotolyl)benzoxazole
*The unsaturated polyester contains a 1 to 1 mole ratio of maleic anhydride and isophthalic acid and has an acid number of 28 (ASTM D-1639-70).
**The unsaturated polyester contains a 1 to 1 mole ratio of maleic anhydride and isophthalic acid and has an acid number of 32 (ASTM D-1639-70).

These photopolymerizable compositions find particular utility as ultraviolet curable films and coatings. Such compositions include unsaturated polymeric compositions and a photoinitiator. Such unsaturated polymeric compositions are, for example, unsaturated polyester and polyurethane compositions, which can also contain minor amounts of poly-α-olefins, polyamides, acrylics, cellulose esters, rubbers both synthetic and natural and the like. Such compositions can be molded or shaped into articles or applied as coatings.

The invention has been described in detail with particular reference to preferred embodiments thereof, but it will be understood that variations and modifications can be effected within the spirit and scope of the invention.

We claim:

1. A molding and coating composition capable of being hardenable by ultraviolet radiation comprising a mixture of a photopolymerizable or photocrosslinkable ethylenically unsaturated compound and from 0.01 to 10% by weight of a photoinitiator selected from the group consisting of aryl heterocyclic compounds having the formula

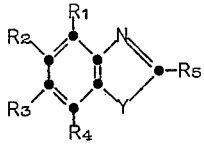

wherein $R_1$, $R_2$, $R_3$ and $R_4$ are hydrogen, alkyl, alkoxy, carboxy, alkoxycarbonyl chlorine, bromine, nitro, amino and can be the same or different;
Y is a nitrogen atom containing an unsubstituted or substituted lower alkyl group having 1 to 12 carbon atoms or an aryl group or substituted aryl group having 6 to 18 carbon atoms;
$R_5$ is $CH_2X$, $CHX_2$, $CX_3$, aryl-$CH_2X$; aryl-$CHX_2$ and aryl-$CX_3$ where X is chlorine and bromine.

2. A molding and coating composition according to claim 1 wherein said photoinitiator has the formula:

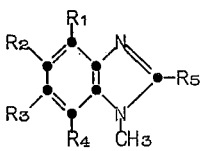

wherein $R_1$, $R_2$, $R_3$ and $R_4$ are hydrogen, alkyl, alkoxy, carboxy, alkoxycarbonyl, chlorine, bromine, nitro, amino and can be the same or different;
$R_5$ is $-CH_2X$, $-CHX_2$, $-CX_3$, -aryl $CH_2X$, -aryl $CHX_2$ and -aryl $CX_3$ where X is chlorine or bromine.

3. A molding and coating composition according to claim 2 wherein said photoinitiator has the formula:

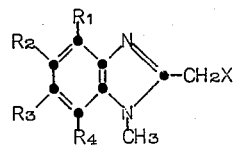

wherein $R_1$, $R_2$, $R_3$ and $R_4$ are hydrogen, alkyl, alkoxy, carboxy, alkoxycarbonyl, chlorine, bromine, nitro, amino and can be the same or different and X is chlorine or bromine.

4. A molding and coating composition according to claim 2 wherein said photoinitiator has the formula:

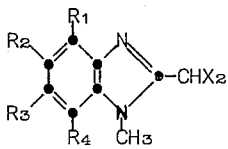

wherein $R_1$, $R_2$, $R_3$ and $R_4$ are hydrogen, alkyl, alkoxy, carboxy, alkoxycarbonyl, chlorine, bromine, nitro, amino and can be the same or different and X is chlorine or bromine.

5. A molding and coating composition according to claim 2 wherein said photoinitiator has the formula:

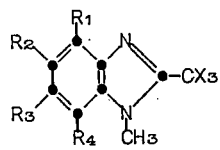

wherein $R_1$, $R_2$, $R_3$ and $R_4$ are hydrogen, alkyl, alkoxy, carboxy, alkoxycarbonyl chlorine, bromine, nitro, amino and can be the same or different and X is chlorine or bromine.

6. A molding and coating composition according to claim 2 wherein said photoinitiator has the formula:

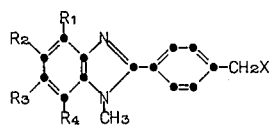

wherein $R_1$, $R_2$, $R_3$ and $R_4$ are hydrogen, alkyl, alkoxy, carboxy, alkoxycarbonyl, chlorine, bromine, nitro, amino and can be the same or different and X is chlorine or bromine.

7. A molding and coating composition according to claim 2 wherein said photoinitiator has the formula:

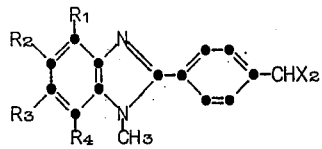

wherein $R_1$, $R_2$, $R_3$ and $R_4$ are hydrogen, alkyl, alkoxy, carboxy, alkoxycarbonyl, chlorine, bromine, nitro, amino and can be the same or different and X is chlorine or bromine.

8. A molding and coating composition according to claim 2 wherein said photoinitiator has the formula:

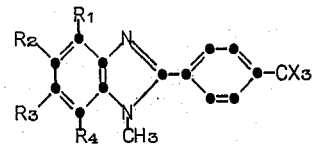

wherein $R_1$, $R_2$, $R_3$ and $R_4$ are hydrogen, alkyl, alkoxy, carboxy, alkoxycarbonyl, chlorine, bromine, nitro, amino and can be the same or different and X is chlorine or bromine.

9. A molding and coating composition according to claim 3 wherein said photoinitiator has the formula:

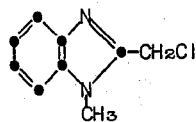

10. A molding and coating composition according to claim 4 wherein said photoinitiator has the formula:

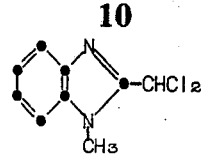

11. A molding and coating composition according to claim 5 wherein said photoinitiator has the formula:

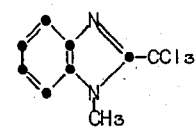

12. A molding and coating composition according to claim 6 wherein said photoinitiator has the formula:

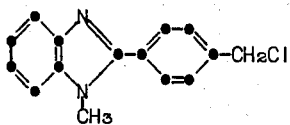

13. A molding and coating composition according to claim 7 wherein said photoinitiator has the formula:

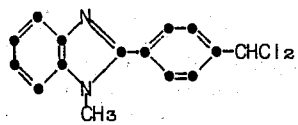

14. A molding and coating composition according to claim 8 wherein said photoinitiator has the formula:

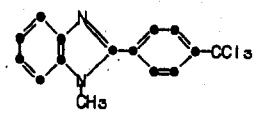

* * * * *